(12) United States Patent
Lu et al.

(10) Patent No.: US 12,278,735 B2
(45) Date of Patent: Apr. 15, 2025

(54) ISOLATION METHOD FOR HIGH-PERFORMANCE COMPUTER SYSTEM, AND HIGH-PERFORMANCE COMPUTER SYSTEM

(71) Applicant: NATIONAL UNIVERSITY OF DEFENSE TECHNOLOGY, Hunan (CN)

(72) Inventors: Pingjing Lu, Hunan (CN); Mingche Lai, Hunan (CN); Zeyu Xiong, Hunan (CN); Jinbo Xu, Hunan (CN); Junsheng Chang, Hunan (CN); Xingyun Qi, Hunan (CN); Zhang Luo, Hunan (CN); Yuan Li, Hunan (CN); Yan Sun, Hunan (CN); Yang Ou, Hunan (CN); Zicong Wang, Hunan (CN); Jianmin Zhang, Hunan (CN)

(73) Assignee: NATIONAL UNIVERSITY OF DEFENSE TECHNOLOGY, Hunan (CN)

( * ) Notice: Subject to any disclaimer, the term of this patent is extended or adjusted under 35 U.S.C. 154(b) by 0 days.

(21) Appl. No.: 18/342,707

(22) Filed: Jun. 27, 2023

(65) Prior Publication Data
US 2024/0073100 A1 Feb. 29, 2024

(30) Foreign Application Priority Data
Aug. 25, 2022 (CN) .......................... 202211028270.4

(51) Int. Cl.
*H04L 41/12* (2022.01)
*H04L 45/745* (2022.01)

(52) U.S. Cl.
CPC ............ *H04L 41/12* (2013.01); *H04L 45/745* (2013.01)

(58) Field of Classification Search
CPC ........ H04L 41/12; H04L 45/745; H04L 45/00
See application file for complete search history.

(56) References Cited

U.S. PATENT DOCUMENTS

| 9,288,187 | B2 * | 3/2016 | Iloglu | ................. H04L 63/0272 |
| 2009/0164630 | A1 * | 6/2009 | Hirata | ................. H04L 63/0236 709/225 |

(Continued)

OTHER PUBLICATIONS

Office Action from CN PTO (Year: 2022).*

*Primary Examiner* — Douglas B Blair
*Assistant Examiner* — Jihad K Boustany
(74) *Attorney, Agent, or Firm* — JCIPRNET (57) ABSTRACT

Disclosed are an isolation method for a high-performance computer system, and a high-performance computer system. The isolation method comprises node-level isolation performed. The node-level isolation comprises: configuring a routing table for each computing node, and configuring, in the routing table, valid routing information for computing node pairs; when any one source computing node needs to communicate with a target computing node, determining, by lookup, whether valid routing information exists between the source computing node and the target computing node according to the configured routing table; if so, allowing the source computing node to communicate with the target computing node; otherwise, forbidding the source computing node from communicating with the target computing node. The disclosure can realize network security isolation of the high-performance computer system, and guarantee the security and reliability of high-performance computers under the premise of ensuring flexible expansion and high availability of high-performance computing resources.

7 Claims, 4 Drawing Sheets

(56) References Cited

U.S. PATENT DOCUMENTS

| | | | |
|---|---|---|---|
| 2011/0075664 A1* | 3/2011 | Lambeth | H04L 69/325 |
| | | | 370/390 |
| 2015/0341209 A1* | 11/2015 | Wittenschlaeger | H04L 63/10 |
| | | | 709/222 |
| 2017/0353431 A1* | 12/2017 | Tjahjono | H04L 49/354 |
| 2018/0109472 A1* | 4/2018 | Kubota | H04L 45/64 |
| 2018/0212875 A1* | 7/2018 | Zhu | H04L 12/4641 |
| 2018/0329730 A1* | 11/2018 | Bansal | G06F 9/455 |
| 2019/0230126 A1* | 7/2019 | Kumar | H04L 45/74 |

* cited by examiner

ISOLATION METHOD FOR HIGH-PERFORMANCE COMPUTER SYSTEM, AND HIGH-PERFORMANCE COMPUTER SYSTEM

CROSS-REFERENCE TO RELATED APPLICATION

This application claims the priority benefit of China application no. 202211028270.4, filed on Aug. 25, 2022. The entirety of each of the above mentioned patent applications is hereby incorporated by reference herein and made a part of this specification.

BACKGROUND

Technical Field

The disclosure relates to security isolation techniques for high-performance computer systems, in particular to an isolation method for a high-performance computer system, and a high-performance computer system.

Description of Related Art

In recent years, the development trend of high performance computing (HPC) indicates that HPC and cloud computing have been deeply combined with the integration and innovation of HPC, cloud computing, big data and artificial intelligence. First, HPC mainly includes the massive passing interface (MPI) technique, efficient communication technique, heterogeneous computing technique and the like, and is biased to exclusive operation, and cloud computing has a flexible deployment capacity and a fault-tolerant capacity, and supports virtualization, unified resource scheduling and flexible system configuration. With the development of technology, HPC and container cloud are being integrated and innovated, high-performance cloud becomes a new product service, and Amazon Web Service (AWS), Alibaba Cloud, Tencent Cloud and Baidu Cloud all have launched high-performance cloud services and products based on HPC and cloud computing. Second, HPC has developed more broadly from previous high-grade, precision and advanced fields. With the development of high-performance computers, especially the constant decrease of the use cost, HPC rapidly expands, from the fields of nuclear weapon development of national strategic significance, information security, oil exploration, aerospace and high-grade less popular scientific computation, to more national economical fields such as pharmaceutical engineering, gene sequencing, animation rendering, digital filming, data mining, financial analysis and internet services, that is to say, HPC has penetrated deep into various industries related to national economy. As can be seen from TOP500 in the ranking list of HPC in recent years, high-performance computing systems are mainly used in the fields of scientific computation, governments, energy, electric power and meteorology, while high-performance computing systems deployed in internet companies in recent five years account for a large proportion, and are mainly used for cloud computing, machine learning, artificial intelligent, big data analysis, short videos, and the like. The sharp increase of the demand for computation in these fields leads to an integration of HPC and the internet technique.

The feature of network virtualization of modern data centers requires, on the one hand, that mutually distrustful users should be isolated, and on the other hand, that resources should be adjusted and shared as required by users and the service quality should be guaranteed. To satisfy these requirements, the network of the data center needs to be divided into different virtual networks; however, due to the fact that the division is static, the flexibility of the network is restrained. In order to increase the utilization rate of resources and realize resource adjustment of the data center, for example, for a data center which provides web services and videos, more web resources may be needed in daytime, so in order to increase the utilization rate of resources, the demands for resources needs to be adjusted dynamically, and the virtual networks of the data center need to be dynamically configured. The virtualization technique is used for dynamic configuration of virtual networks, that is, a network is dynamically divided into different zones during operation.

In addition, the complexity of high-performance computers increases ultralinearly with the increase of the system scale. The centralized design is the mainstream physical design used for constructing large-scale complex systems. Due to the requirements for power supply, heat dissipation, air conditioning, network cabling, I/O distribution, user access, stability, reliability and maintainability, the system is often constructed in a central room; and after the system is constructed, the physical and morphological stability of the system should be maintained in principle, and the physical structure of the system should not be changed frequently to guarantee the sustainability and stability of the system. At present, the high-performance computer system is typically adopts a hierarchical intensive design structure of board-component-frame-cabinet-system, and is composed of multiple cabinets, and the cabinets are connected through interconnection networks to rapidly form a large-scale high-performance computer system; each cabinet comprises multiple frames; each frame includes multiple components and a power module; each component includes multiple boards, and the components are connected through frame backboards; the boards include computing boards, communication boards, monitoring boards, and the like, each computing board is provided with multiple nodes, and the communication board is composed of a network interface chip used for accessing computing nodes to the system and a route switching chip used for route switching. After the system is constructed, network cabling and connection will be completed in principle, the nodes, and the components or the cabinets are connected through corresponding physical lines to form a network topology, such that overall communication and accessibility of the system are realized. Because the physical properties of the system are stable, connecting lines between the components of the network do not need to be frequently adjusted under the condition of meeting the isolation requirement of network zones.

With the constant increase of the computation speed of HPC from the petascale level (P level) to the exascale level (E level), the system scale expands continuously, the high-performance computer will support more users and applications, and in many application scenarios, users or applications need to be isolated and even multiple applications of one user need to be isolated. The feature of network virtualization of modern data centers requires that mutually distrustful users should be isolated, and that resources should be adjusted and shared as required by users and the service quality should be guaranteed. The high-performance computer system should support flexible isolation between network zones, privacy protection and security isolation between virtual environments of the whole system scale, and flexible expansion and high availability of high-performance computing resources.

SUMMARY

In view of the above-mentioned problems in the prior art, the technical issue to be settled by the disclosure is to provide an isolation method for a high-performance computer system, and a high-performance computer system, to realize network security isolation of the high-performance computer system, and guarantee the security and reliability of high-performance computers under the premise of ensuring flexible expansion and high availability of high-performance computing resources.

In order to solve the above technical problems, the technical solutions used in the present invention are as follows.

An isolation method for a high-performance computer system, comprising: performing node-level isolation including:

S101: configuring a routing table for each computing node, and configuring, in the routing table, valid routing information between the computing node and other computing nodes allowed to communicate with the computing node; and S102: when any one source computing node needs to communicate with a target computing node, searching and determining whether valid routing information exists between the source computing node and the target computing node according to the configured routing table by the source computing node; if valid routing information exists, allowing the source computing node to communicate with the target computing node; if no valid routing information exists, forbidding the source computing node from communicating with the target computing node.

In some embodiments, the step S102 further comprises: when any one target computing node receives a message from the source computing node, searching and determining whether valid routing information exists between the target computing node and the source computing node according to the configured routing table by the target computing node; if valid routing information exists, receiving the message from the source computing node; if no valid routing information exists, rejecting the message from the source computing node.

In some embodiments, the step S101 further comprises: configuring a routing table for each switching node in a high-performance computer system, and configuring, in the routing table, valid routing information for computing nodes allowed to communicate with each other; and the step S102 further comprises: when one switching node receives a message for communication, searching and determining whether valid routing information exists in the routing table according to a source computing node and a target computing node in the message; if valid routing information exists, forwarding the message to the target computing node; if no valid routing information exists, discarding the message.

In some embodiments, when the routing table is configured, the isolation method further comprises: determining zones corresponding to the computing nodes first, wherein each computing node corresponds to one or more zones, and only the computing node serving as an I/O node or a global node corresponds to multiple zones; and then, configuring routing information of the routing table to allow computing nodes corresponding to a same zone to communicate with each other and forbid computing nodes corresponding to different zones from communicating with each other, such that global interconnection of computing nodes corresponding to multiple zones is realized with the computing node corresponding to the multiple zones as the I/O node or the global node.

In some embodiments, the step of configuring the routing information of the routing table includes configuring a valid routing link and a network exit.

In some embodiments, the step of configuring routing information of the routing table to allow computing nodes corresponding to the same zone to communicate with each other and forbid computing nodes corresponding to different zones from communicating with each other refers to: only configuring routing information of the computing nodes corresponding to the same zone to allow the computing node corresponding to the same zone to communicate with each other, and not configuring routing information of the computing nodes corresponding to different zones to forbid the computing nodes corresponding to different zones from communicating with each other; or, configuring the routing information of the computing nodes corresponding to the same zone and setting the routing information as valid to allow the computing node corresponding to the same zone to communicate with each other, and configuring the routing information of the computing nodes corresponding to different zones and setting the routing information as invalid to forbid the computing nodes corresponding to different zones from communicating with each other.

In some embodiments, the isolation method for a high-performance computer system further comprising: performing topology-level isolation: based on a link enabling function configured in a network interface chip of the computing nodes of a high-performance computer system or in a route switching chip of the high-performance computer system, enabling or disabling a designated network port, to logically or physically disconnect a physical line to which the network port is connected, so as to realize topology-level isolation of the high-performance computer system.

In some embodiments, the topology-level isolation of the high-performance computer system comprises at least one of isolation of a physical line between cabinets of the high-performance computer system and isolation of a physical line between frames of the high-performance computer system.

In some embodiments, the isolation method further comprising: performing user-level isolation: deploying virtual machines on the computing nodes, wherein each virtual machine operates an independent operating system and has an independent storage space and I/O space, and the user-level isolation of a high-performance computer system is realized through the virtual machines.

In some embodiments, when the user-level isolation is realized through the virtual machines, the isolation method further comprises: when the virtual machines deployed on one computing node are less than a set threshold, allocating an independent virtual network interface card for each virtual machine on the computing node to realize communication isolation between the virtual machines, wherein each network interface card uses an independent register configuration space to realize communication isolation between the virtual network interface cards, and communication between the virtual network interface cards corresponding to the virtual machines is realized through upper switching; and when the virtual machines deployed on one computing node are greater than or equal to the set threshold, allocating one or more common virtual network interface card for the virtual machines on the computing node, wherein at least two virtual machines share a same virtual network interface card through a virtual switch vSwitch, and the computing node realizes flow isolation and protection between the virtual network interface cards in the aspect of hardware through a virtual local area network of a network interface chip.

In some embodiments, A high-performance computer system using the isolation method for a high-performance computer system mentioned above, comprising one or more cabinets, wherein the cabinet comprises one or more frames, the frame comprises a power module and one or more components, the component comprises multiple boards connected through frame backboards, the multiple boards comprises computing boards and communication boards, multiple computing nodes are disposed on each said computing board, a network interface chip used for accessing the computing nodes to the high-performance computer system and a route switching chip used for realizing route switching between the computing nodes are disposed on each said communication board, and the route switching chips of the communication boards are connected through physical lines to form a network topology.

Compared with the prior art, the disclosure mainly has the following advantages.

1. The isolation method provided by the disclosure includes performing node-level isolation steps for a high-performance computer system, which includes: configuring a routing table for each computing node, and configuring, in the routing table, valid routing information for the computing node and other computing nodes allowed to communicate with the computing nodes; and when any one source computing node needs to communicate with a target computing node, determining, by lookup, whether valid routing information exists between the source computing node and the target computing node according to the configured routing table; if valid routing information exists, allowing the source computing node to communicate with the target computing node; if no valid routing information exists, forbidding the source computing node from communicating with the target computing node.

According to the node-level isolation method based on routing configuration provided by the disclosure, under the condition of maintaining global physical communication, a system is flexibly divided through routing configuration into different zones which are mutually isolated, and nodes cannot communicate with each other, such that communication isolation between any nodes is realized; the node-level zone isolation mechanism based on routing configuration is more flexible than topology-level isolation and has no requirement for physical positions of nodes; in addition, the zone isolation mechanism based on routing configuration is realized generally by configuring routing tables through software, supports dynamic configuration, is more flexible than topology-level isolation, and has no requirement for physical positions of nodes.

2. The application range is wide: as mentioned above, HPC and cloud computing have been deeply combined with the integration and innovation of HPC, cloud computing, big data and artificial intelligence, so the network isolation technique not only needs to meet the requirement for centralized design of high-performance computers, but also needs to meet the requirement for virtualization of data centers; the disclosure can perform node-level isolation of the high-performance computer system to realize network security isolation of the high-performance computer system, and can guarantee the security and reliability of high-performance computers under the premise of ensuring flexible expansion and high availability of high-performance computing resources.

3. The disclosure can further combine topology-level isolation and user-level isolation to realize three levels of isolation, namely topology-level isolation, node-level isolation and user-level isolation, with the isolation granularity becoming smaller gradually, various network zone isolation mechanisms are provided and can be used jointly according to system, user and application requirements to realize static and dynamic network zone isolation of different granularities and intensities, privacy protection and security isolation between virtual environments of the whole system scale and flexible expansion and high availability of high-performance computing resources, a static and dynamic flexible network zone isolation mechanism is realized, and the flexibility is good.

DESCRIPTION OF THE EMBODIMENTS

Figure 1:
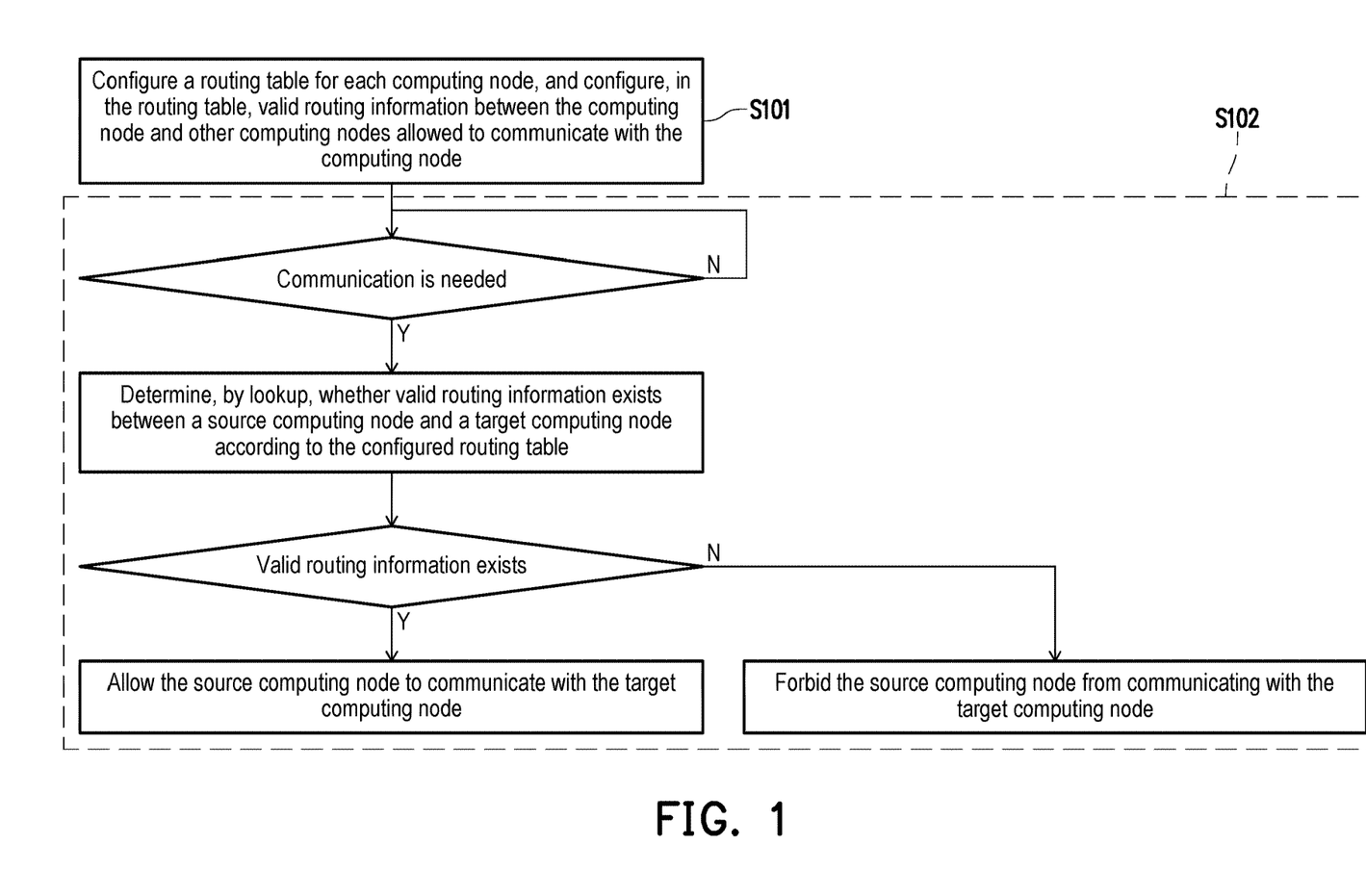
FIG. 1 is a flow diagram of node-level isolation in one embodiment of the disclosure.

As shown in FIG. 1, one embodiment provides an isolation method for a high-performance computer system, which includes: performing node-level isolation comprising following steps.

S101: a routing table for each computing node is configured, and valid routing information for the computing node and other computing nodes allowed to communicate with the computing node is configured in the routing table.

S102: when any one source computing node needs to communicate with a target computing node, whether valid routing information exists between the source computing node and the target computing node according to the configured routing table by the source computing node is determined by lookup.

If valid routing information exists, the source computing node communicates with the target computing node.

If no valid routing information exists, the source computing node abandons communication with the target computing node.

To further improve the security of the node-level isolation, as an optional implementation, The step S102 further includes: when any one target computing node receives a message from the source computing node, determining, by lookup, whether valid routing information exists between the target computing node and the source computing node according to the configured routing table by the source computing node; if valid routing information exists, receiving the message from the source computing node; if no valid routing information exists, rejecting the message from the source computing node.

To further improve the security of the node-level isolation, as an optional implementation, The step S101 in this embodiment further includes: configuring a routing table for each switching node in a high-performance computer system, and configuring, in the routing table, valid routing information for computing nodes allowed to communicate with each other; and the step S102 further includes: when one switching node receives a message for communication, determining, by lookup, whether valid routing information exists in the routing table according to a source computing node and a target computing node in the message; if so, forwarding the message to the target computing node; otherwise, discarding the message. In this way, network isolation is realized both in the dimension of computing nodes and in the dimension of switching nodes, which is more secure and reliable.

To simplify the configuration of the routing table and improve the configuration effect of the routing table, in this embodiment, when the routing table is configured, the isolation method further include: determining zones corresponding to the computing nodes, wherein each computing node corresponds to one or more zones, and only the computing node serving as an I/O computing node or a global node corresponds to multiple zones; then, configuring routing information of the routing table to allow computing nodes corresponding to a same zone to communicate with each other and forbid computing nodes corresponding to different zones from communicating with each other, such that global interconnection of computing nodes corresponding multiple zones is realized with the computing node corresponding to multiple zones as the I/O node or the global node. The node-level zone isolation mechanism based on routing configuration is more flexible than topology-level isolation and has no requirement for physical positions of the computing nodes. One node may belong to one zone or belong to multiple zones, and generally, the node belonging to multiple zones is an I/O node or a global node. The zone isolation mechanism based on routing configuration is realized generally by configuring routing tables through software, and supports dynamic configuration. Under the condition of maintaining global physical communication, the system is flexibly divided through routing configuration into different zones which are mutually isolated, and nodes cannot communicate with each other. The node-level zone isolation mechanism based on routing configuration is realized generally by configuring routing tables through software, supports dynamic configuration, is more flexible than topology-level isolation and has no requirement for physical positions of the computing nodes. Through the above method, the routing table can be configured by assigning computing nodes with markers of corresponding zones, that is, the configuration of the routing table can be generated automatically by means of a program according to the markers of the zones, such that the purpose of simplifying and improving the configuration of the routing table can be realized effectively. As an optional implementation, automatically generating the configuration of the routing table by means of a program according to the markers of the zones comprises following steps.

S201: a computing node set in the high-performance computer system is traversed to select a current computing node; if all computing nodes in the computing node set are traversed and selected, the process is ended and exited; otherwise, S202 is performed.

S202: zone information assigned to the current computing node is read; if no zone information is available, the processing is ended and exited; otherwise, a zone set (such as an array) by zones assigned to the current computing node is generated, and S203 is performed.

S203: the zone set to select a current zone is traversed; if all the zones in the zone set are traversed and selected, S201 is performed; otherwise, S204 is performed.

S204: all other computing nodes assigned with the current zone are obtained, and for each of the other computing nodes assigned with the current zone, routing information is generated according to the current computing node and all the other computing nodes assigned with the current zone, and the routing information is wrote into the current computing node, all the other computing node assigned with the current zone, and the routing table of the corresponding switching node (these three routing information configuration behaviors can be selected according to the specific implementation of the node-level isolation); and S203 is performed.

As an optional implementation, in this embodiment, configuring routing information of the routing table to allow computing nodes corresponding to a same zone to communicate with each other and forbid computing nodes corresponding to different zones from communicating with each other refers to only configuring routing information of the computing nodes corresponding to the same zone to allow the computing node corresponding to the same zone to communicate with each other and not configuring routing information of the computing nodes corresponding to different zones to forbid the computing nodes corresponding to different zones from communicating with each other. In this embodiment, configuring the routing information of the routing table comprises configuring a valid routing link and a network exit, routing information between two computing nodes is generated through the routing link and the network exit, such that routing communication between the two computing nodes can be realized easily. In addition, conserving that it may take a long time to generate routing information due to the large number (such as one hundred thousand) of computing nodes in the high-performance computer system, in order to improve the dynamic adjustment and configuration efficiency of the routing table of the high-performance computer system, as an optional implementation, configuring routing information of the routing table to allow computing nodes corresponding to a same zone to communicate with each other and forbid computing nodes corresponding to different zones from communicating with each other refers to configuring the routing information of the computing nodes corresponding to the same zone and setting the routing information as valid to allow the computing node corresponding to the same zone to communicate with each other and configuring the routing information of the computing nodes corresponding to different zones and setting the routing information as invalid to forbid the computing nodes corresponding to different zones from communicating with each other.

Figure 2:
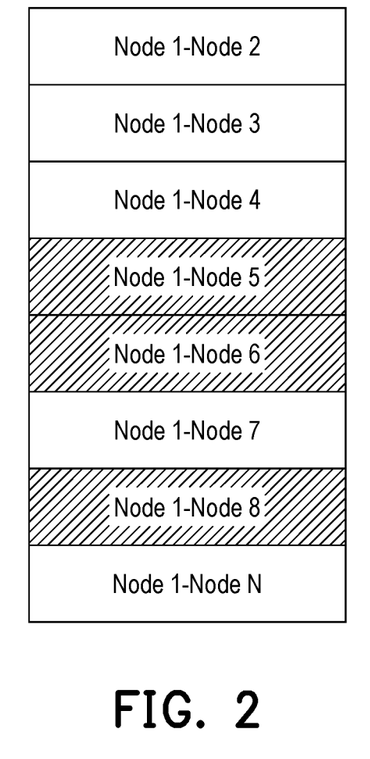
FIG. 2 illustrates an example of routing information configuration of a routing table in one embodiment of the disclosure.

As shown in FIG. 2, for N computing nodes from node 1 to node N, a routing table between node 1 and node 2, . . . , and between node 1 and node N is configured to realize communication isolation between node 1 and any of the other computing nodes. Routing links and network exits from node 1 to the other nodes are defined in the routing table of node 1. When node 1 is allowed to communicate with node N, routing between this pair of nodes is configured, as illustrated by the non-shaded part in FIG. 2; when node 1 is not allowed to communicate with node K, routing between this pair of nodes is not configured, or routing between this pair of nodes is configured as invalid, so when a message for communication between node 1 and node K appears in the network, the message will be discarded due to the failure to obtain available communication routing, and that the network between node 1 and node K is blocked, as illustrated by the shaded part in FIG. 2.

Figure 3:
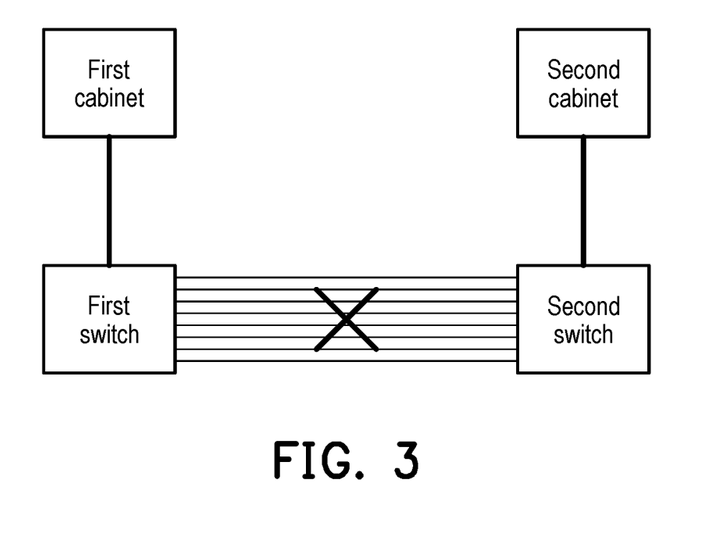
FIG. 3 is a schematic diagram of topology-level isolation in one embodiment of the disclosure.

In addition, as a further supplement of the node-level isolation, the isolation method in this embodiment further comprises: performing topology-level isolation: based on a link enabling function configured in a network interface chip of the computing nodes of a high-performance computer system or in a route switching chip of the high-performance computer system, a designated network port is enabled or disabled to logically or physically disconnect a physical line to which the network port is connected, so as to realize topology-level isolation. Specifically, a link enabling function is configured in the network interface chip or the route switching chip, and the link Serdes or link state is configured to enable or disable a certain network port, such that even if two ports are connected through a physical line, the physical line can be disconnected logically. As shown in FIG. 3, a first cabinet is connected to a first switch, a second cabinet is connected to a second switch, the first switch and second switch are connected through a physical line, and the physical line between the first switch and second switch can be disconnected through topology-level isolation, such that topology-level isolation is realized.

The topology-level isolation of the high-performance computer system comprises at least one of isolation of physical lines between cabinets of the high-performance computer system and isolation of physical lines between frames. For example, the communication of two cabinets (the first cabinet and the second cabinet) on the network topology of the high-performance computer system can be realized through the connection between switches (the first switch and second switch), and a logic link between the cabinets can be disconnected through link configuration, to realize network zone isolation between the cabinets. This zone isolation mechanism is used for topology-level isolation to realize isolation between cabinets, isolation between frames, and even isolation between nodes. Such an isolation mechanism can fulfill the same effect as physical link isolation, has a high zone isolation capacity, can realize static configuration, and can also realize dynamic configuration through software.

For large-scale network application, the granularity of topology-level isolation and node-level isolation is still relatively coarse, and isolation between multiple applications running on the same computing node is further needed. In addition, for computing nodes, the resource allocation and scheduling mechanism based on virtual machines has been relatively mature. Each virtual machine operates an independent operating system and has an independent storage space and I/O space, and the virtual machines are mutually isolated, and resources in each virtual machine cannot be directly accessed by other virtual machines. So, this isolation requirement can be met through network virtualization to realize user-level isolation. Therefore, as a further supplement of the topology-level isolation and the node-level isolation, the isolation method in this embodiment further comprises: performing user-level isolation: deploying virtual machines on the computing nodes, wherein each virtual machine operates an independent operating system and has an independent storage space and I/O space, and the user-level isolation is realized through the virtual machines.

To realize the user-level isolation, the network interface chip and the route switching chip of the high-performance computer system should support network virtualization. A host interface of the network interface chip supports single root I/O virtualization (SR-IOV) to realize multiple Ethernet virtual network interface cards and a plurality of virtual management interfaces in each network card. Each virtual network interface card uses an independent register configuration space to realize communication isolation between the virtual network interface cards, and communication between the virtual network interface cards is realized through upper switching.

In this embodiment, when the user-level isolation is realized through the virtual machines, the isolation method further comprises: when the virtual machines deployed on one computing node are less than a set threshold, allocating an independent virtual network interface card for each virtual machine on the computing node to realize communication isolation between the virtual machines, wherein each virtual network interface card uses an independent register configuration space to realize communication isolation between the virtual network interface cards, and communication between the virtual network interface cards corresponding to the virtual machines is realized through upper switching; and when the virtual machines deployed on one computing node are greater than the set threshold, allocating one or more common virtual network interface card for the virtual machines on the computing node, wherein at least two virtual machines share a same virtual network interface card through a virtual switch (vSwitch), and the computing node realizes flow isolation and protection between the virtual network interface cards in the aspect of hardware through a virtual local area network of a network interface chip. When the scale of virtual machines supported by the node is large, the virtual machines share the virtual network interface card through vSwitches, and the network interface chip supports VLan and VxLan, and flow isolation and protection between the virtual network interface cards is realized through hardware. Through the virtualization function of the network interface chip and the route switching chip, user-level network zone isolation between virtual machines is realized. This isolation is dynamically realized through corresponding network configuration management software, is smaller in granularity and more flexible, and can realize insensible communication isolation for users.

Figure 4:
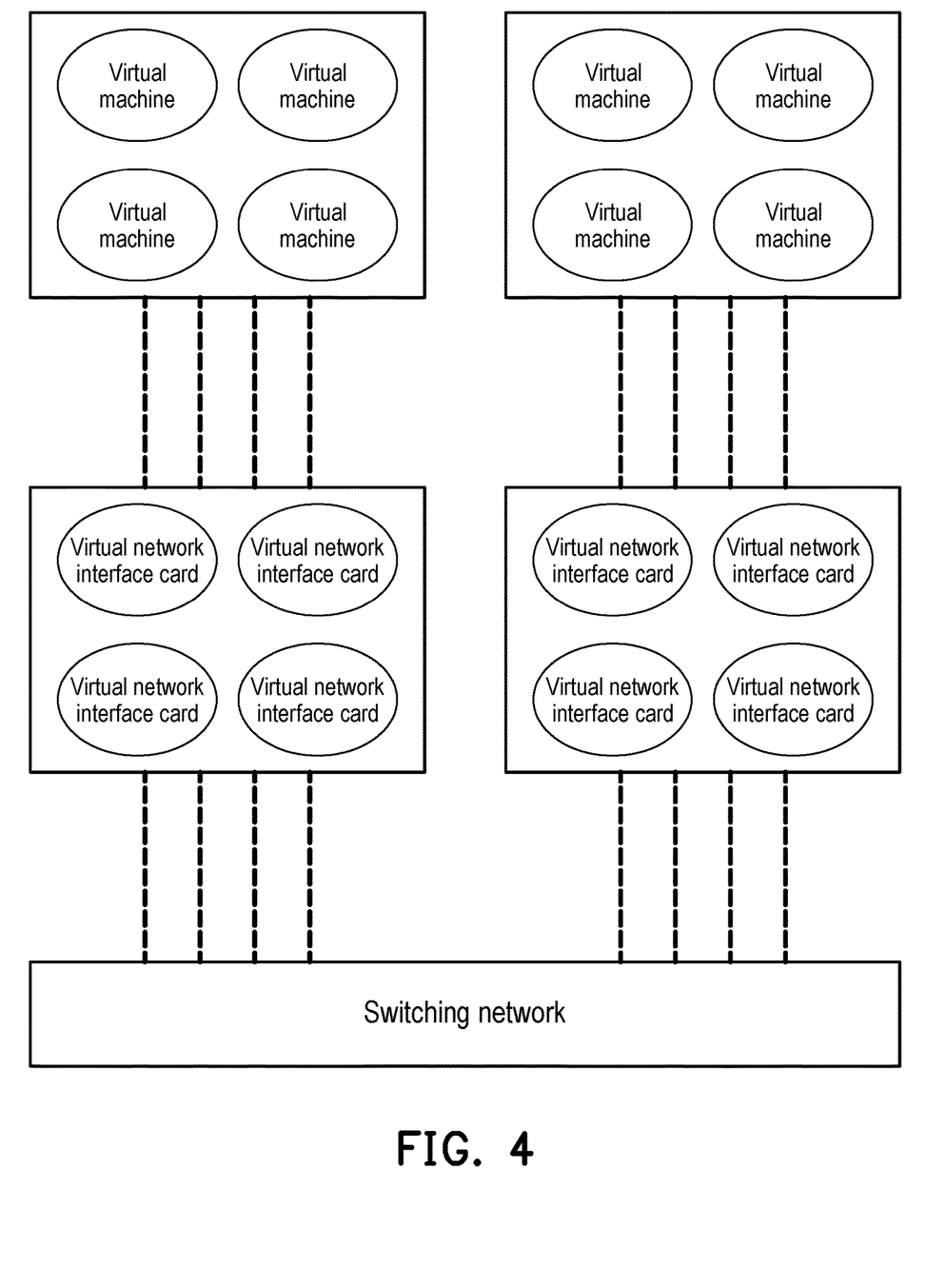
FIG. 4 is a principle diagram of virtualization for user-level isolation in one embodiment of the disclosure.
Figure 5:
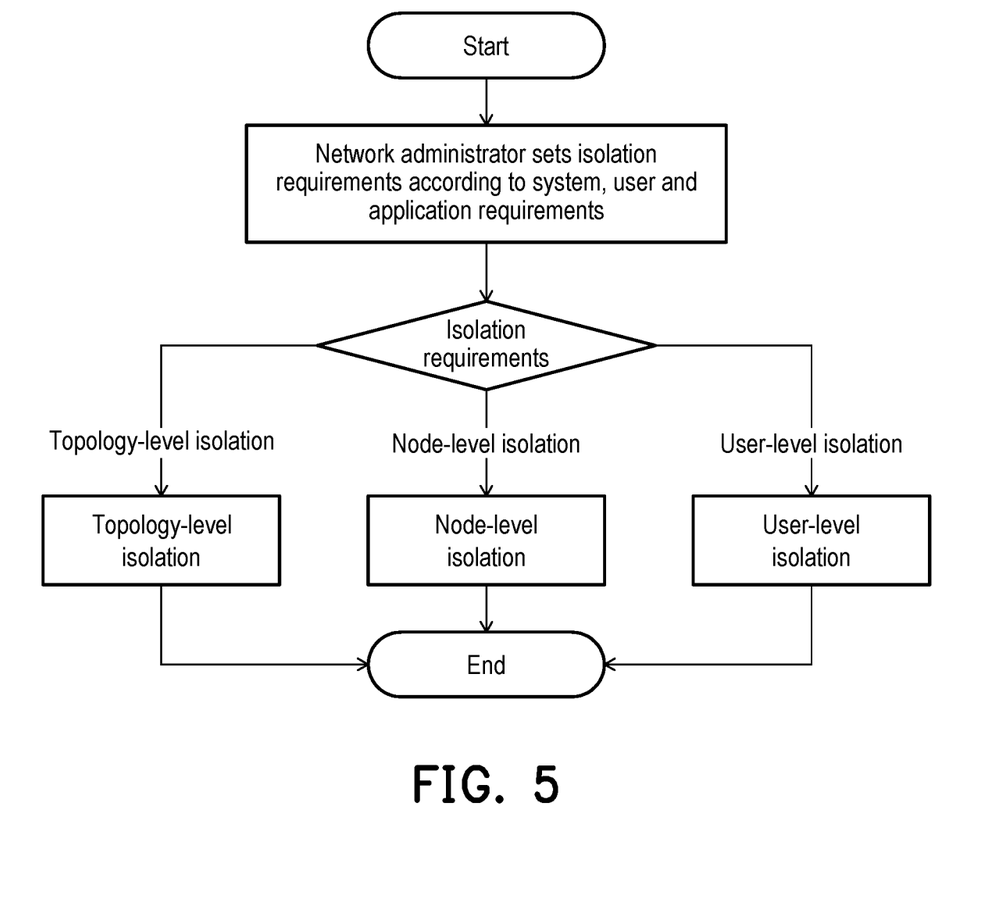
FIG. 5 is a flow diagram of operation by a network administrator for isolation of multiple granularities in one embodiment of the disclosure.

As shown in FIG. 4, based on the single-Root I/O virtualization (SR-IOV) function of the host interface of the network interface chip, M Ethernet virtual network interface cards and N virtual management interfaces can be realized in one network interface chip, wherein M and N are natural numbers; each virtual network interface card uses an independent register configuration space to realize communication isolation between the virtual network interface cards, and communication between the virtual network interface cards is realized through a switching network.

To sum up, the isolation method in this embodiment supports hierarchical network isolation on the topology level, the node level and the user level, and the isolation granularities of the topology-level isolation, the node-level isolation and the user-level isolation become smaller gradually. The disclosure can realize static and rigid zone isolation through hardware and can also realize dynamic zone isolation through software, supports zone isolation of different granularities and intensities according to different application requirements, realizes a flexible network zone isolation mechanism for the high-performance computer system, supports privacy protection and security isolation between virtual environments of the whole system scale, and guarantees flexible expansion and high availability of high-performance computing resources. The network administrator sets isolation requirements according to system, user and application requirements and selects the topology-level isolation, the node-level isolation or the user-level isolation. The topology-level isolation refers to physical isolation between part of units or node groups and the other part of units or node groups of the high-performance computer system, such as isolation between cabinets or isolation between frames; the node-level isolation refers to isolation between part of nodes and the other parts of nodes of the high-performance computer system, such as isolation between nodes in frames; user-level isolation refers to network zone isolation between multiple user programs running on the same node; and according to the requirement for the zone isolation granularity, one or more of the topology-level isolation, the node-level isolation or the user-level isolation are selected. The topology-level isolation is implemented by configuring a link enabling function in the network interface chip and the route switching chip and configuring the link Serdes and link state to enable or disable a designated network port. The node-level isolation is implemented by configuring a routing table in the network interface chip and the route switching chip to define a transmission link between a pair of nodes to realize communication isolation between any nodes. The user-level isolation is implemented by realizing user-level network zone isolation between virtual machines based on the network virtualization function of the network interface chip and the route switching chip. During the implementation of the user-level isolation, when the scale of virtual machines supported by the nodes is small, an independent virtual network interface card is allocated for each virtual machine to realize communication isolation between the virtual machines; when the scale of virtual machines supported by the nodes is large, the virtual machines share a virtual network interface card through virtual switches (vSwitches), and flow isolation and protection between the virtual network interface cards are realized through hardware based on the virtual local area network (VLan) function and the virtual extensible local area network (VxLan) function of the network interface chip. The topology-level isolation may be realized by static link configuration or be realized by dynamic configuration through software. The node-level isolation is realized by configuring routing tables through software. The user-level isolation is dynamically realized through network configuration management software. The isolation method in this embodiment mainly has the following advantages: 1, the application range is wide: as mentioned above, HPC and cloud computing have been deeply combined with the integration and innovation of HPC, cloud computing, big data and artificial intelligence, so the network isolation technique not only needs to meet the requirement for centralized design of high-performance computers, but also needs to meet the requirement for virtualization of data centers; the network zone isolation mechanism including three levels of isolation, namely topology-level isolation, node-level isolation and user-level isolation, in this embodiment supports privacy protection and security isolation between virtual environments of the whole system scale and guarantees flexible expansion and high availability of high-performance computing resources. 2. This embodiment can realize a flexible network zone isolation mechanism combining static isolation and dynamic isolation and is high in flexibility. In this embodiment, three levels of isolation, namely topology-level isolation, node-level isolation and user-level isolation, with the isolation granularity becoming smaller gradually are used, and various network zone isolation mechanisms are provided and can be used jointly according to system, user and application requirements to realize static and dynamic network zone isolation of different granularities and intensities, privacy protection and security isolation between virtual environments of the whole system scale and flexible expansion and high availability of high-performance computing resources. 3. According to the link-based topology-level isolation method provided by this embodiment, communication of two cabinets on the topology can be realized through the connection of switches, and the logic link between the cabinets can be disconnected through link configuration to realize network zone isolation between the cabinets; this zonal isolation mechanism is used for topology-level isolation to realize isolation between cabinets, frames, or even nodes; and such an isolation mechanism can fulfill the same effect as physical link isolation, has a high zone isolation capacity, can realize static configuration, and can also realize dynamic configuration through software. 4. According to the node-level isolation method based on routing configuration provided by this embodiment, under the condition of maintaining global physical communication, a system is flexibly divided through routing configuration into different zones which are mutually isolated, and nodes cannot communicate with each other, such that communication isolation between any nodes is realized; the node-level zone isolation mechanism based on routing configuration is more flexible than topology-level isolation and has no requirement for physical positions of nodes; in addition, the zone isolation mechanism based on routing configuration is realized generally by configuring routing tables through software, supports dynamic configuration, is more flexible than topology-level isolation, and has no requirement for physical positions of nodes. 5. According to the user-level isolation method based on network virtualization provided by this embodiment, user-level network zone isolation between virtual machines is realized based on the network virtualization function of the network interface chip and the route switching chip; for large-scale network application, the granularity of topology-level isolation and node-level isolation is still relatively coarse, and isolation between multiple applications running on a same node is further needed; the user-level isolation method is dynamically realized through corresponding network configuration management software, is smaller in granularity and more flexible, and can realize insensible communication isolation for users. In general, this embodiment provides a network zone isolation mechanism based on software and hardware, which realizes static and rigid zone isolation through hardware and realizes dynamic zone isolation through software, and multiple network zone isolation mechanisms can be used jointly according to system, user and application requirements to realize static and dynamic network zone isolation of different granularities and intensities.

In addition, this embodiment further provides a high-performance computer system using the isolation method for a high-performance computer system, which comprises one or more cabinets, wherein the cabinet comprises one or more frames, the frame comprises a power module and one or more components, the component comprises multiple boards which are connected through frame backboards, the multiple boards comprises computing boards and communication boards, multiple computing nodes are disposed on each computing board, a network interface chip used for accessing the computing nodes to the high-performance computer system and a route switching chip used for realizing route switching between the computing nodes are disposed on each communication board, and the route switching chips of the communication boards are connected through physical lines to form a network topology, such that global communication and accessibility of the computing nodes in the high-performance computer system is realized. The high-performance computer system adopts a hierarchical intensive design structure of board-component-frame-cabinet-system, and is composed of multiple cabinets, and the cabinets are connected through interconnection networks to rapidly form a large-scale high-performance computer system; each cabinet comprises multiple frames; each frame comprises multiple components and a power module; each component comprises multiple boards, and the components are connected through frame backboards; the boards comprise computing boards, communication boards, monitoring boards, and the like, each computing board is provided with multiple nodes, and the communication board is composed of a network interface chip used for accessing computing nodes to the system and a route switching chip used for route switching. After the system is constructed, network cabling and connection will be completed in principle, the nodes, and the components or the cabinets are connected through corresponding physical lines to form a network topology, such that overall communication and accessibility of the system are realized. Because the physical properties of the system are stable, connecting lines between the components of the network do not need to be frequently adjusted under the condition of meeting the isolation requirement of network zones. As required by HPC and cloud computing, the high-performance computer system supports a flexible network zone isolation mechanism, privacy protection and security isolation between virtual environments of the whole system scale, and flexible expansion and high availability of high-performance computing resources. In addition, to realize topology-level isolation, physical switches can be disposed in the network interface chip and the route switching chip according to requirements to configure a link enabling function in the network interface chip and the route switching chip, and the link Serdes or link state can be configured to enable or disable a certain network port to physically disconnect a corresponding line.

The above embodiments are merely preferred ones of the disclosure, and the protection scope of the disclosure is not limited to the above embodiments. All technical solutions obtained based on the concept of the disclosure should fall within the protection scope of the disclosure. It should be pointed out that various improvements and embellishments can be made by those ordinarily skilled in the art without departing from the principle of the disclosure, and all these improvements and embellishments should fall within the protection scope of the disclosure.

What is claimed is:

1. An isolation method for a high-performance computer system comprising a plurality of computing nodes, the isolation method comprising:
   selecting a plurality of network zone isolation mechanisms including node-level isolation and user-level isolation;
   performing the node-level isolation comprising following steps:
   using one of the plurality of computing nodes one by one as a current computing node, and configuring a routing table corresponding to the current computing node, wherein configuring the routing table comprises: configuring, in the routing table, valid routing information between the current computing node and each of other compute nodes of the plurality of computing nodes that is allowed to communicate with the current computing node; and
   when any one source computing node of the plurality of computing nodes needs to communicate with a target computing node of the plurality of computing nodes, searching the routing table corresponding to the source computing node via the source computing node to determine whether the valid routing information exists between the source computing node and the target computing node; if the valid routing information exists between the source computing node and the target computing node, allowing the source computing node to communicate with the target computing node; and if no valid routing information exists between the source computing node and the target computing node, forbidding the source computing node from communicating with the target computing node; and
   deploying virtual machines on the computing nodes, wherein each of the virtual machines operates an independent operating system and has an independent storage space and I/O space, and the user-level isolation of a high-performance computer system is realized through the virtual machines,
   wherein when the user-level isolation is realized through the virtual machines, the isolation method further comprises:
   when a number of the virtual machines deployed on one computing node are less than a set threshold, allocating an independent virtual network interface card for each virtual machine on the computing node to realize communication isolation between the virtual machines, wherein each independent virtual network interface card uses an independent register configuration space to realize communication isolation between the independent virtual network interface cards, and communication between the independent virtual network interface cards corresponding to the virtual machines is realized through a virtual switch; and
   when a number of the virtual machines deployed on one computing node are greater than or equal to the set threshold, allocating one or more common virtual network interface cards for the virtual machines on the computing node, wherein at least two of the virtual machines share a same common virtual network interface card through the virtual switch, and the computing node realizes flow isolation and protection between the common virtual network interface cards in the aspect of hardware through a virtual local area network of a network interface chip.

2. The isolation method for the high-performance computer system according to claim 1, wherein when the source computing node needs to communicate with the target computing node, the isolation method further comprises following steps:
   when any one target computing node of the plurality of computing nodes receives a message from the source computing node of the plurality of computing nodes, searching the routing table corresponding to the target computing node via the target computing node to determine whether the valid routing information exists between the target computing node and the source computing node;
   if the valid routing information exists between the target computing node and the source computing node receiving the message from the source computing node;

if no valid routing information exists between the target computing node and the source computing node, rejecting the message from the source computing node.

3. The isolation method for the high-performance computer system according to claim 2, further comprising following steps:
configuring another routing table for each of a plurality of switching node in the high performance computer system, and configuring, in the another routing table, valid routing information between computing nodes, which are allowed to communicate with each other, of the plurality of computing nodes; and
when one of the plurality of switching node receives a message for communication, searching the routing table corresponding to the one of the plurality of switching node to determine whether the valid routing information exists between a source computing node and a target computing node in the message is set as valid;
if the valid routing information exists between the source computing node and the target computing node in the message, forwarding the message to the target computing node;
if no valid routing information exists between the source computing node and the target computing node in the message, discarding the message.

4. The isolation method for the high-performance computer system according to claim 3, wherein only the computing node of the plurality of computing nodes serving as an I/O node or a global node in the plurality of computing nodes corresponds to multiple zones, and each of other computing nodes in the plurality of computing nodes correspond to one or more zones; and
step of configuring the routing table comprises following steps:
traversing computing nodes of a computing node set in the high-performance computer system to select one of the plurality of computing nodes as the current computing node;
if all the computing nodes in the computing node set are traversed and selected, ending the said configuring the routing table;
if all computing nodes in the computing node set are not traversed and selected, reading zone information assigned to the current computing node and generating a zone set according to the zone information assigned to the current computing node;
if no zone information is assigned to the current computing node, ending the said configuring the routing table;
if zone information is assigned to the current computing node, traversing the zone set to select a current zone;
if all zones in the zone set are traversed and selected, performing the said traversing each a computing node set;
obtaining all other computing nodes assigned with the current zone, and for each of the other computing nodes assigned with the current zone, generating the routing information according to the current computing node and all the other computing nodes assigned with the current zone, and writing the routing information into the current computing node, all the other computing node assigned with the current zone, and the routing table of the corresponding switching node; and performing the said traversing the zone set.

5. The isolation method for the high-performance computer system according to claim 4, wherein the step of configuring the routing table further comprises:

only configuring the routing information of the computing nodes corresponding to the same zone to allow the computing node corresponding to the same zone to communicate with each other, and not configuring the routing information of the computing nodes corresponding to different zones to forbid the computing nodes corresponding to different zones from communicating with each other;
or, configuring the routing information of the computing nodes corresponding to the same zone and setting the routing information as valid to allow the computing node corresponding to the same zone to communicate with each other, and configuring the routing information of the computing nodes corresponding to different zones and setting the routing information as invalid to forbid the computing nodes corresponding to different zones from communicating with each other.

6. The isolation method for the high-performance computer system according to claim 1, wherein the plurality of network zone isolation mechanisms further include topology-level isolation, and the isolation method further comprises:
Performing the topology-level isolation of the high-performance computer system, which comprises at least one of isolation of a physical line between cabinets of the high-performance computer system and isolation of a physical line between frames of the high-performance computer system, comprising:
based on a link enabling function configured in a network interface chip of the computing nodes of the high-performance computer system or in a route switching chip of the high-performance computer system, enabling or disabling a designated network port, to logically or physically disconnect a physical line to which the network port is connected.

7. A high-performance computer system, comprising one or more cabinets, wherein each of the one or more cabinets comprises one or more frames, each of the one or more frames comprises a power module and one or more components, each of the one or more components comprises multiple boards connected through frame backboards, the multiple boards comprises computing boards and communication boards, multiple computing nodes are disposed on each of the computing boards, a network interface chip used for accessing the computing nodes to the high-performance computer system and a route switching chip used for realizing route switching between the computing nodes are disposed on each of the communication boards, and the route switching chips of the communication boards are connected through physical lines to form a network topology, the high-performance computer system using an isolation method, comprising:
selecting a plurality of network zone isolation mechanisms including node-level isolation and user-level isolation;
performing the node-level isolation comprising following steps:
using one of the plurality of computing nodes one by one as a current computing node, and configuring a routing table corresponding to the current computing node, wherein configuring the routing table comprises:
configuring, in the routing table, valid routing information between the current computing node and each of other compute nodes of the plurality of computing nodes that is allowed to communicate with the current computing node; and when any one source computing node of the plurality of computing nodes needs to communicate with a target computing node of the plurality of computing nodes, searching the routing table corresponding to the source computing node via the source computing node to determine whether the valid routing information exists between the source computing node and the target computing node;

if the valid routing information exists between the source computing node and the target computing node, allowing the source computing node to communicate with the target computing node; and if no valid routing information exists between the source computing node and the target computing node, forbidding the source computing node from communicating with the target computing node; and deploying virtual machines on the computing nodes, wherein each of the virtual machines operates an independent operating system and has an independent storage space and I/O space, and the user-level isolation of a high-performance computer system is realized through the virtual machines, wherein when the user-level isolation is realized through the virtual machines, the isolation method further comprises:

when a number of the virtual machines deployed on one computing node are less than a set threshold, allocating an independent virtual network interface card for each virtual machine on the computing node to realize communication isolation between the virtual machines, wherein each independent virtual network interface card uses an independent register configuration space to realize communication isolation between the independent virtual network interface cards, and communication between the independent virtual network interface cards corresponding to the virtual machines is realized through a virtual switch; and when a number of the virtual machines deployed on one computing node are greater than or equal to the set threshold, allocating one or more common virtual network interface cards for the virtual machines on the computing node, wherein at least two of the virtual machines share a same common virtual network interface card through the virtual switch, and the computing node realizes flow isolation and protection between the common virtual network interface cards in the aspect of hardware through a virtual local area network of a network interface chip.

* * * * *